US009335886B2

(12) United States Patent
Quinn et al.

(10) Patent No.: US 9,335,886 B2
(45) Date of Patent: May 10, 2016

(54) FACILITATING USER INTERACTION WITH MULTIPLE DOMAINS WHILE PREVENTING CROSS-DOMAIN TRANSFER OF DATA

(71) Applicant: Assured Information Security, Inc., Rome, NY (US)

(72) Inventors: Rian Patrick Quinn, Rome, NY (US); Brendan Timothy Kerrigan, Rome, NY (US)

(73) Assignee: ASSURED INFORMATION SECURITY, INC., Rome, NY (US)

( * ) Notice: Subject to any disclaimer, the term of this patent is extended or adjusted under 35 U.S.C. 154(b) by 318 days.

(21) Appl. No.: 13/800,262

(22) Filed: Mar. 13, 2013

(65) Prior Publication Data

US 2014/0282050 A1   Sep. 18, 2014

(51) Int. Cl.
*G06F 3/0481* (2013.01)
*G06F 9/44* (2006.01)

(52) U.S. Cl.
CPC ............ *G06F 3/0481* (2013.01); *G06F 9/4445* (2013.01); *G06F 2203/04803* (2013.01)

(58) Field of Classification Search
CPC .............................. G06F 9/4445; G06F 3/0481
USPC .......................................................... 715/744
See application file for complete search history.

(56) References Cited

U.S. PATENT DOCUMENTS

| 7,681,134 | B1 * | 3/2010 | Grechishkin et al. ......... 715/740 |
| 8,397,306 | B1 * | 3/2013 | Tormasov ............... G06F 21/00 713/164 |
| 8,584,211 | B1 * | 11/2013 | Vetter et al. ...................... 726/4 |
| 2006/0005187 | A1 * | 1/2006 | Neil .................................. 718/1 |
| 2007/0018992 | A1 * | 1/2007 | Wong ..................... G06F 3/1431 345/545 |
| 2012/0131574 | A1 * | 5/2012 | Day et al. ............................ 718/1 |
| 2012/0297383 | A1 * | 11/2012 | Meisner ................... G06F 3/165 718/1 |
| 2012/0317569 | A1 * | 12/2012 | Payne, Jr. .................. G06F 21/53 718/1 |
| 2013/0013664 | A1 * | 1/2013 | Baird ..................... H04L 67/025 709/203 |
| 2013/0232238 | A1 * | 9/2013 | Cohn et al. ..................... 709/220 |
| 2014/0019968 | A1 * | 1/2014 | Deng et al. ......................... 718/1 |
| 2014/0245444 | A1 * | 8/2014 | Lutas et al. ....................... 726/24 |

OTHER PUBLICATIONS

Kauer, B., Verissimc, P., & Bessani, A. (Jun. 27, 2011). Recursive virtual machines for advanced security mechanisms. Retrieved Jan. 20, 2015, from http://ieeexplore.ieee.org/xpls/icp.jsp?arnumber=5958796.*
Frame Buffer. (Mar. 1, 2012). Retrieved Apr. 30, 2015, from http://web.archive.org/web/20120301182217/http://en.wikipedia.org/wiki/Framebuffer.*

* cited by examiner

*Primary Examiner* — Phenuel Salomon
*Assistant Examiner* — David Luu
(74) *Attorney, Agent, or Firm* — Matthew M. Hulihan, Esq.; Heslin Rothenberg Farley & Mesiti P.C.

(57) ABSTRACT

User interaction with multiple domains is facilitated while preventing cross-domain transfer of data from those domains. A compositioning domain facilitates this interaction in a secure manner in which cross-domain transfer of data is prevented. This includes obtaining pixel information from the domains via one or more read-only communication paths, providing a user interface to the user, which includes providing a display buffer including at least some of the pixel information obtained from each domain of the domains for display to the user, and maintaining an in-focus domain state. The in-focus domain state indicates which domain of the domains is currently in-focus. User input from the user based on the user interface is provided by a user input handler directly to the currently in-focus domain indicated by the in-focus domain state absent transfer of the user input to the compositioning domain.

25 Claims, 11 Drawing Sheets

US 9,335,886 B2

FACILITATING USER INTERACTION WITH MULTIPLE DOMAINS WHILE PREVENTING CROSS-DOMAIN TRANSFER OF DATA

STATEMENT REGARDING FEDERALLY SPONSORED RESEARCH AND DEVELOPMENT

This invention was made, in part, with government support under contract numbers FA9550-12-1-0229, awarded by the United States Air Force Office of Scientific Research (AFOSR) and FA8750-11-D-0235, awarded by the United States Air Force Research Laboratory. Accordingly, the United States Government may have certain rights in the invention.

BACKGROUND

Users of computing devices often view, edit, and create digital information that is intended to remain within a single information domain. For instance, a user may work with an email client maintaining an employer-provided email account, while also interacting with a chat program hosting a chat between the user and a social acquaintance. The email client in this example is part of a corporate information domain managed by the employer, while the chat program is part of a personal information domain managed by the user. For security, privacy, or other reasons, it may be desired to prevent the exchange of data between these two information domains. The employer may desire that the information associated with the email client, such as the content of the email messages and the email account password stored by the program, remain within that corporate domain, and that the contents of the chat be prevented from entering the corporate domain, and vice versa. By way of specific example, the employer may wish to prevent a user from copying the contents of an email message (from within the email client) into a chat dialog box of the chat program, and the user may wish to prevent the inadvertent sending of a reply email in the corporate domain containing a message that was intended to be placed into the chat window in the personal domain.

Corporate and personal domains are just two examples of domains that might be defined for the containment of information. Other examples include, but are not limited to: a healthcare domain—containing patient information and/or applications that use patient information; finance—containing sensitive financial data; and government—containing encrypted confidential information that is decryptable by a verified application but that is not to be copied or duplicated.

What is needed is an effective and secure way of allowing a user to interact with separate domains as part of a single interface, while the cross-domain transfer of information is prevented.

BRIEF SUMMARY

The shortcomings of the prior art are overcome and additional advantages are provided through the provision of a method for facilitating user interaction with multiple domains in which applications execute. The method includes, for instance, providing, by a processor, a compositioning domain to facilitate interaction between a user and at least two domains in which applications execute, the at least two domains executing as separate execution environments for executing their respective applications, wherein the compositioning domain facilitates interaction between the user and the at least two domains in a secure manner in which cross-domain transfer of data is prevented, wherein the facilitating interaction includes: obtaining pixel information from the at least two domains via a read-only communication path; providing a user interface to the user, the providing including providing a display buffer of the compositioning domain, the display buffer including at least some of the pixel information obtained from each domain of the at least two domains for display to the user; and maintaining an in-focus domain state indicating which domain of the at least two domains is currently in-focus, wherein user input from the user based on the user interface is provided by a user input handler directly to the currently in-focus domain indicated by the in-focus domain state absent transfer of the user input to the compositioning domain.

Systems and computer program products relating to one or more aspects are also described and claimed herein.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
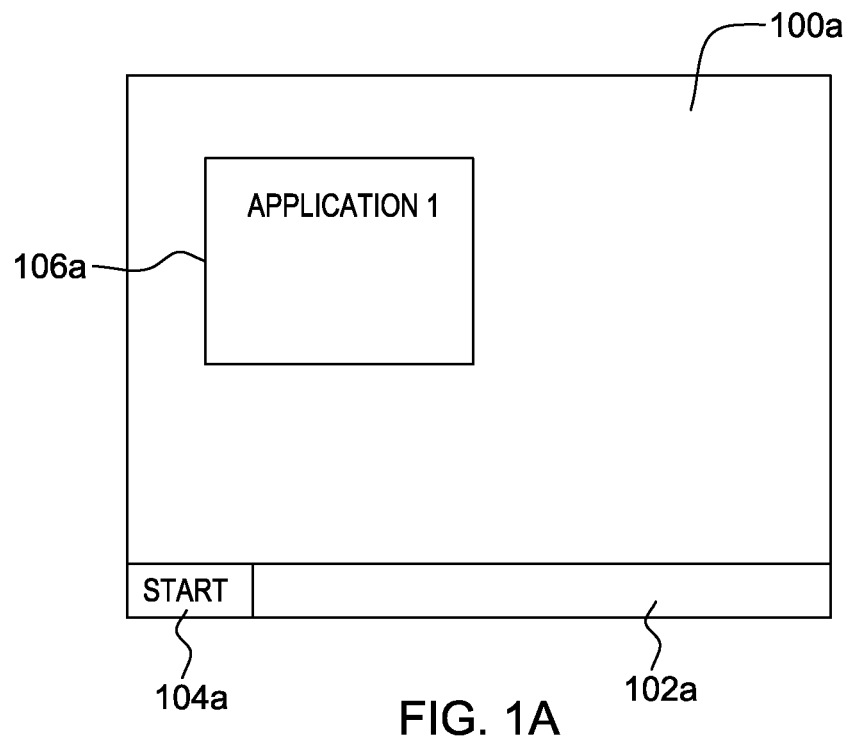
FIGS. 1A-1B depict example desktops within two different domains.

Various approaches enable user interaction with information in multiple domains. In a simplest example, physically separated computing devices are used, such as an employer-provided laptop executing an email client and a personal computer for executing a chat program. From usability and other standpoints, this approach is impractical. Consequently, other approaches have been developed in which the domains are presented as part of a single device.

One approach uses two computers that are essentially coupled together and provided as part of a single box. An input/output (I/O) switcher, such as a keyboard-video-mouse (KVM) switch or similar device switches the I/O between the two computers. This approach provides a single workstation at the expense of using separate and redundant hardware for executing two environments—one for each domain.

In another approach, a single set of computer hardware is provided and the domains are logically split within that computer. Most such examples involve either virtualization, using the XenClient®, for instance, provided by Citrix Systems, Inc., Santa Clara, Calif., U.S.A., where each domain is presented in a different operating system executing in its own virtual machine, or some form of a separation kernel where all information associated with a domain is labeled accordingly.

In a further approach, a thin client is provided, where the execution of the applications with which the user interacts occurs on one or more back-end machines. The thin client displays data from the back-end machine(s) and takes keyboard and mouse data and sends it to the back-end machine(s) when necessary.

It is important in all of the above cases to provide some way for displaying for the user what is happening in the separate domains. Multiple monitors can be used, for instance, in which each monitor displays the desktop of each separate operating system (corresponding to one domain). A single monitor screen may instead be split in half, with half of the pixels dedicated to displaying one operating system and the other half dedicated to displaying another operating system. Each scenario is disruptive to the user because the domains are maintained visually apart from each other—that is, the desktops are separated.

Security concerns arise when usability is enhanced by combining hardware. The most secure interfaces (e.g. completely separate computers with separate monitors) are generally the least usable interfaces, and the most usable interfaces tend to be the least secure. In the field of cross-domain architectures, a user may desire to use a single personal computer and monitor to view and edit content from multiple domains (for instance an "Unclassified" security-level domain, a "Secret" security-level domain, and a "Top Secret" security level domain). Physical isolation, separation kernels, and hypervisors that exist today do not address how to present this data from multiple domains to the user with high levels of both usability and security. For example, a typical separation kernel requires that each domain present its data on separate video cards, thus forcing the user to switch between domains (similar to how a KVM operates today). The lack of usability can cause a user to cut corners and/or invest in less secure cross-domain solutions. None of the above-approaches provide for user interfaces that support true, cross-domain productivity. If the user wishes to work with an email client in one domain and a chat message in a chat client of another domain, the user must flip between each domain, back and forth as the user performs his or her objectives. This can be distracting, as each time the user moves from one domain to another—be it switching to another machine or desktop—the user must mentally realign with the task and his/her train of thought for that task.

Provided herein is a seamless windowing capability for cross-domain information systems that provides a user interface that is both secure and usable. The user interface can mimic existing, single-domain workstation interfaces (e.g. single desktop with windowed applications) without sacrificing security, such as by opening a hole for cross-domain information transfer.

Seamless windowing described herein enables interaction with a single computer and a single visual surface, wherein applications from multiple domains are seamlessly, simultaneously, and securely displayed for interaction with a user. The user can be presented an application window from a first domain and an application window from a second domain shown on the same monitor through the same screen buffer at the same time such that the applications appear to be part of a single environment. The user is able to switch between the applications as though the applications were part of a single environment, e.g. by moving a mouse cursor from a window of one domain and clicking into a window of another domain. The provided environment provides the ability to see all domains as part of a single screen buffer. In one example, the single screen buffer is presented to a single monitor, though in other examples the information of the screen buffer is spanned across multiple monitors.

Unlike approaches that dive to the operating system level when extracting domain information, aspects of the seamless windowing provided herein dive deeper, i.e. to the application level when extracting domain specific information. Additionally, this is done securely in a manner that prevents common methods of cross-domain information transfer, such as screen-scraping, key logging, and copying and pasting.

Aspects of the present invention are described below using examples in which a user interacts with information from two (i.e. first and second) domains. Principles described herein, however, apply to user interaction with any number of domains with which a user wishes to interact.

As described in further detail below, a third domain is provided that extracts pixel information for applications of two (or more) underlying domains. The third domain is a compositioning domain (also referred to herein as a MultiView domain) in that it combines some or all of the pixel information to seamlessly integrate the pixel information of the underlying domains. The combined pixel information is then presented to the user.

Figure 1B:
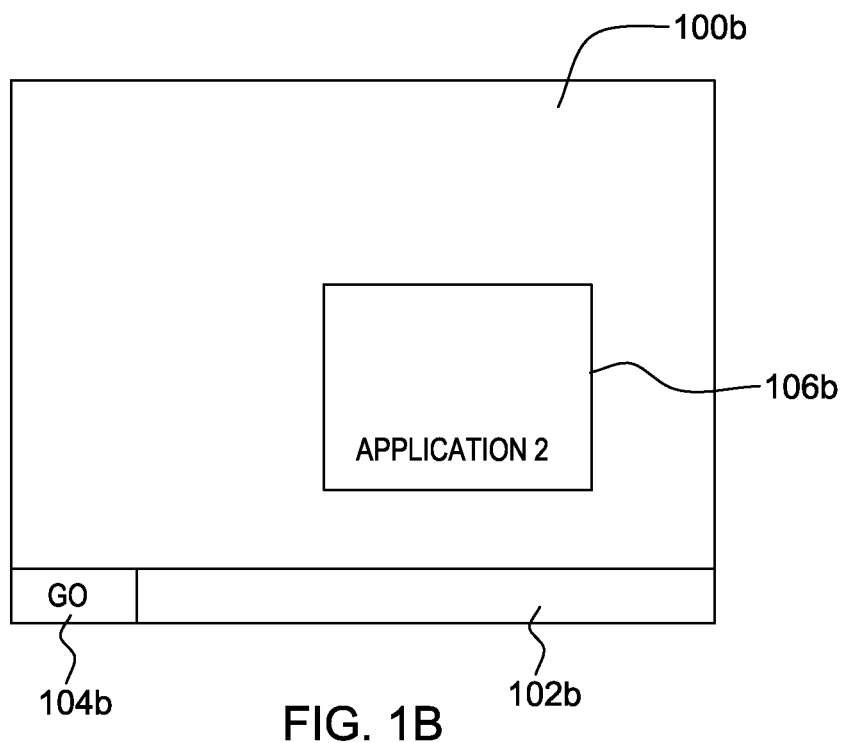

To illustrate, first consider FIGS. 1A and 1B that each depict an example desktop view of a respective domain. In these examples, each domain is an operating system that presents a desktop and displays an application window of an application running on that operating system. In one example, each operating system executes within its own separate virtual machine on one or more data processing systems. FIG. 1A displays information from domain 1, and includes desktop 100*a* having a taskbar 102*a*, which includes an application launcher button 104*a* (titled Start in this example). Start button 104*a* opens one or more menus through which a user can invoke execution of various programs. In this example, a user has selected to run an application, Application 1. The graphical representation of Application 1 is presented within window 106*a* of desktop 100*a*. For convenience, a graphical representation of an application (e.g. 106*a*) may be referred to herein as simply an "application", though it is understood that the window, i.e. what the user sees, is actually a graphical depiction of the application executing on the underlying hardware. Additionally, though not depicted, desktop 100*a* may include a "wallpaper" or desktop background that appears below the open application windows.

FIG. 1B depicts an analogous desktop in domain 2. Desktop 100*b* includes a taskbar 102*b* with application launcher button 104*b*, titled Go. An application, Application 2, runs in domain 2 and is presented by window 106*b* on desktop 100*b*.

FIGS. 1A and 1B depict the graphical user interfaces that are presented to the user working in the respective domains. This graphical user interface is presented as pixel information to a display buffer (also referred to as a screen buffer, framebuffer, or framestore). The display buffer buffers the pixel information for output to one or more display devices. The pixel information includes color values for each picture element (pixel), and those color values dictate what is drawn on the display device/screen for the user. When a user interacts with an application window, i.e. by typing into an input field, moving a mouse, or by way of other user input, the input is translated to information typically used by the executing application (or host operating system, as examples). In some cases, the application receives the input, which causes some modification to the application and an update to the pixel information being sent for display, in order to reflect the interaction. For instance, when a user provides a character input via a keyboard, the application receives the input. That character is displayed on the screen by changing the pixel information of that application to display that character. Thus, the user indirectly interacts with the application and data thereof data via the graphical elements displayed on the screen, which are simply pixel information representative of what is happening in the operating system and applications executing thereon. The pixel information is changed when a change occurs to the application such that its graphical representation is changed. Hence, all the user really needs to be able to effectively observe what is happening with an application is the pixel information that is being output.

Aspects of the present invention leverage this principle. The third domain (compositioning or MultiView domain) obtains and displays pixel data from each of the other domains, i.e. those having the executing applications and other information with which the user interacts. There is no need for the compositioning domain to extract or pull-out any of the application data of the applications executing in the underlying domains. Instead, that information remains within the domain in which the application executes, and subject to any and all security measures implemented thereon. No application data is transferred up to the compositioning domain. Instead, the pixel information for displaying each underlying application is "cut" from the screen buffer of the underlying domains, and transferred in a secure fashion (one-way, read-only) to the compositioning domain.

Figure 2A:
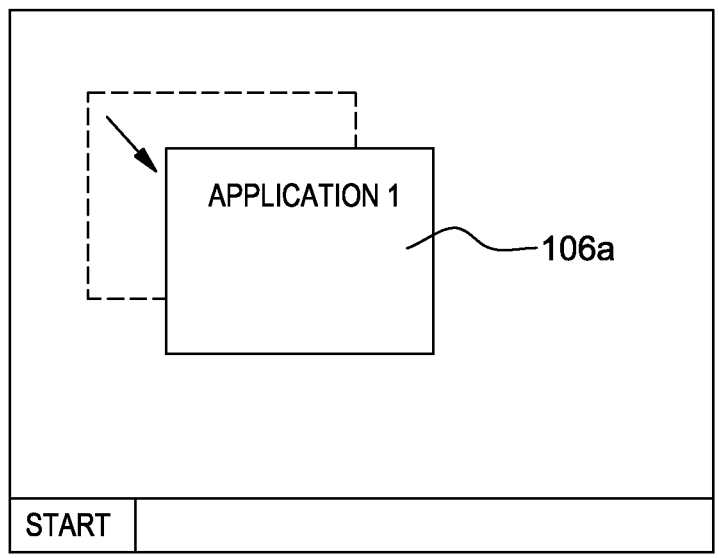
FIGS. 2A-2B depict extraction of pixel information for applications in the two domains of FIGS. 1A and 1B, in accordance with aspects described herein.
Figure 2B:
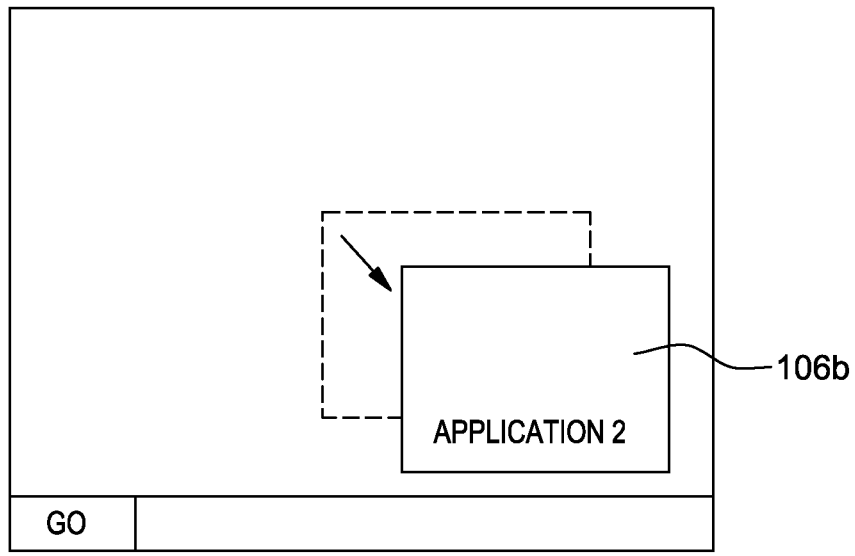

This cutting of the application windows is described with reference to FIGS. 2A and 2B, which depict extraction of pixel information for applications in the two domains of FIGS. 1A and 1B. FIG. 2A depicts the pixel information for Application 1, 106a, being extracted from the screen buffer of domain 1. The remainder of the pixel information in domain 1's screen buffer can be ignored by the compositioning domain, and thus the compositioning domain can selectively extract pixel information from the domain screen buffers. Analogously, in FIG. 2B, the pixel information for Application 2, 106b, in domain 2's screen buffer, is extracted and obtained by the compositioning domain, and the remainder of the pixel information in domain 2's screen buffer is ignored.

Pixel information obtained from the underlying domains includes, in one example, information identifying the location(s) of the various application window(s) that appear in the domain, and this enables the compositioning domain to selectively extract only that pixel information that is of interest. Information indicating window and other graphical element positioning can be made available by, e.g., an operating system of the underlying domain, and the compositioning domain can access that information.

The compositioning domain maintains a screen buffer into which at least some of the extracted pixel information is assembled for display to a user as an integrated desktop environment having information from disparate domains. The extraction by the compositioning domain can be performed at near-native speeds for graphical display, for instance at about 40 frames per second or more depending on the capabilities of the hardware. The compositioning domain thusly provides a windowing capability that seamlessly displays applications from multiple domains on the same monitor, at the same time. In this manner, the interface provides a seamless integration of applications from each of those domains within an integrated desktop view, rather than simply entire separate desktop views corresponding to each of the separate domains.

The compositioning domain is, in one embodiment, implemented by a modified version of Security-Enhanced Linux (SELinux), which is most typically a Linux kernel integration. The SELinux code can run as a virtual machine that is read-only (in that its code cannot be altered) and reset-on-boot, in which no additional applications other than those that facilitate aspects herein are executed, and no user access is granted (not even administrative access). Additionally, no data transfer is made by way of the compositioning domain from one domain to another. Thus, should an attacker gain access to the compositioning domain, the attacker is unable to use the compositioning domain to send information from one domain to another domain (i.e. data obtained from domain 1 to the compositioning domain, and then provided from compositioning domain to domain 2). By making the data transfer mechanism read-only, an attacker causing data that is to be retrieved by the compositioning domain from the first domain has no way of causing that data to be sent from the compositioning domain to the second domain. In this manner, the compositioning domain can be provided as a lightweight, dedicated piece of software with its sole purpose being to display pixels, much like a typical computer monitor would. In some embodiments, this is provided within an external display device itself, such as a monitor connected to a standard computer executing the two underlying domains. The compositioning domain can provide support for any underlying domain architecture, for instance a variety of operating systems and applications executing thereon, such as a WINDOWS®-based operating system or UNIX®-based operating system, or applications executing thereon.

Figure 3:
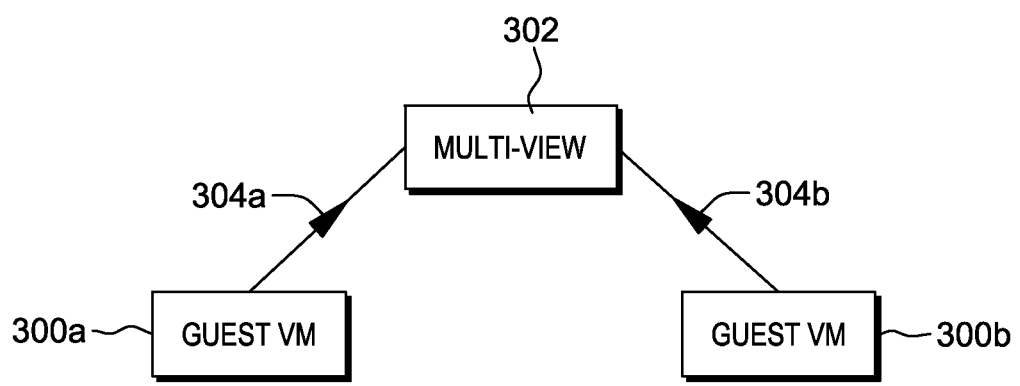
FIG. 3 depicts one-way transfer of pixel information from underlying domains to a compositioning domain, in accordance with aspects described herein.

One way data transfer diodes can be used to securely transfer pixel information from the underlying domains to the compositioning domain. FIG. 3 depicts the one-way transfer of this information from the underlying domains to the compositioning domain. In FIG. 3, the compositioning (MultiView) domain 302, which is a separate virtual machine in this example, reads selected pixel information from domain 1, 300a, running as a guest virtual machine, and reads selected pixel information from domain 2, 300b, running as a separate guest virtual machine. The pixel information is read via read-only communication paths 304a and 304b in this example.

In one embodiment, where the compositioning and other domains execute on the same data processing system, the read-only nature of this communication can be enforced by leveraging hardware capabilities. For instance, each of the above guest virtual machines all run on top of a hypervisor (such as a modified version of the Xen® hypervisor) that is configurable to provide domain isolation by way of virtualization hardware extensions. In one particular embodiment, the paging system is exploited wherein the pages of memory that are accessible by the compositioning domain (i.e. those that contain the pixel information) are marked as read only for the compositioning domain. This enables the compositioning domain to read (i.e. access and obtain) data from those memory pages, but will raise an exception if the compositioning domain attempts a write to the memory pages. In that case, the hypervisor (referred to as "domain 0" or "Dom0" in the Xen® hypervisor context) recognizes the exception and prevents the write from occurring, via an exception handler, for instance. For other embodiments, such as when the first and second domain environments exist on a server (e.g. using the thin client approach described above), the server can be configured to provide each desktop's pixel data in a read only fashion to the compositioning domain, which is prevented from writing data back to the server. Ultimately, what matters in this regard is that read-only communication is being enforced, rather than how it is being enforced.

Accordingly, the pixel information from each of the domains with which the user wishes to interact is transferred to (or pulled by) the compositioning domain in a read-only fashion. The compositioning domain can read the pixel data from the underlying domains, but it is prevented from writing data back down to those domains. In some embodiments, an ability is provided to send events (such as Boolean events) to the underlying domains through the hypervisor and/or to provide configuration information to the underlying system as a whole, again by way of the hypervisor (e.g. Xen®). Preventing the compositioning domain from writing down to the underlying domains from which the pixel information is extracted facilitates prevention of the cross-domain transfer of information (i.e. between the underlying domains). This is the case even if a hacker obtains control of the compositioning domain; there would be no way for the hacker to extract information from one domain and place it into another domain.

As mentioned above, identifications of window locations are needed for those windows of the first and second domains that are to be displayed for the user, in order to enable efficient extraction of pixel data on a per-window basis. In one example, this window location information is saved in off-screen memory in the respective screen buffers of the domains. In one particular embodiment, circular queues are used to prevent the 'producer/consumer problem' and prevent the need to write down synchronization information to the individual underlying domains. The window location information is used to determine which pixels to read. Region math, in conjunction with the window information, can be used to ensure that, in a worst case scenario, only the number of pixels equal to the total number of pixels on the user's screen(s) are copied, no matter how many domains are involved. In a best case, very little is needed to be copied because only 'dirty pixels' (i.e. ones having stale information) must be updated. In one example, the display driver provides this dirty pixel information in a circular queue. Once the proper pixel information is obtained from the first and second domains, the data can be used to assemble an interface suitable for presentation to the user.

This process can be analogized to a similar process of taking a picture of separate monitors, each displaying a desktop of a different underlying domain, printing the pictures, cutting the application(s) from each one of those pictures, and then arranging the cutout applications on a blank canvas to form a third desktop view. The third view is placed into the screen buffer of the compositioning domain and is displayed on monitor(s). The process is repeated, in one example, at 40 or more frames-per-second.

Figure 4A:
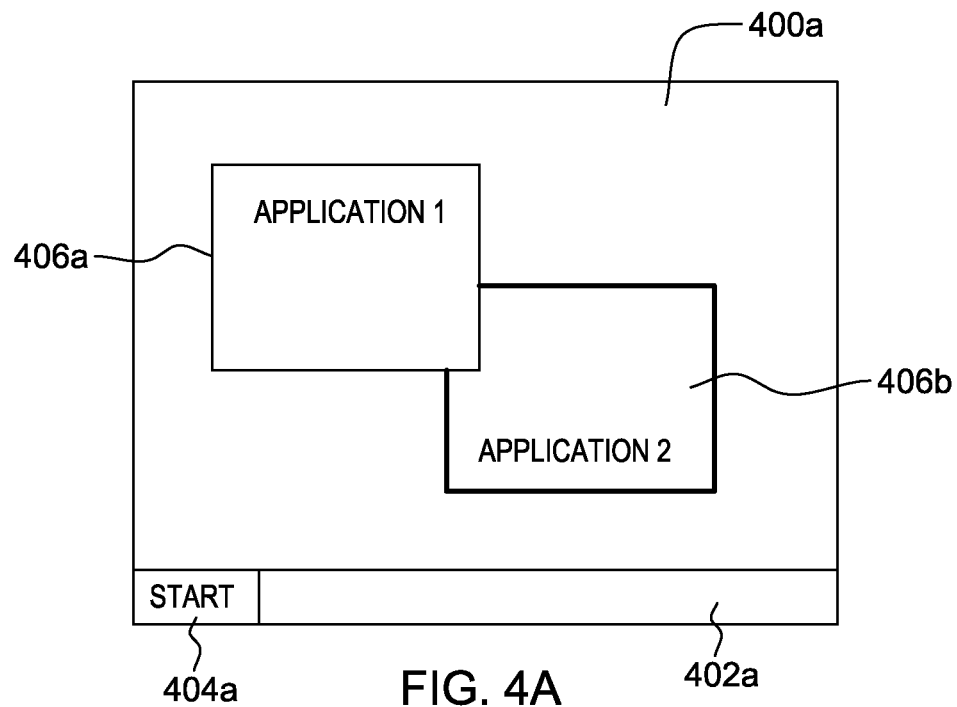
FIGS. 4A-4B depict example seamless desktops provided by a compositioning domain, in accordance with aspects described herein.
Figure 4B:
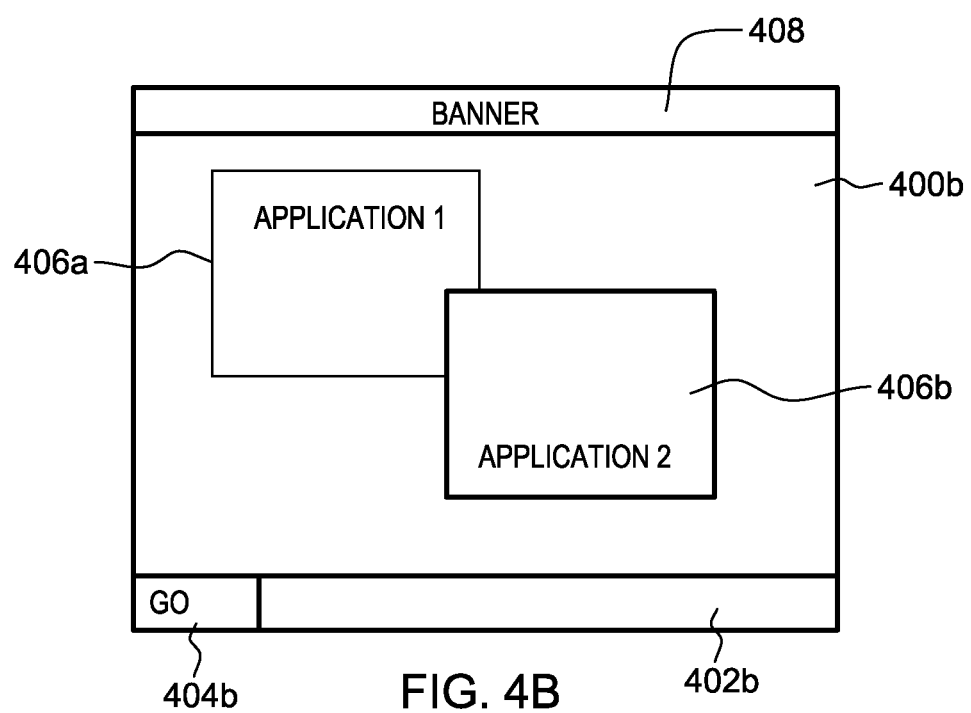

FIGS. 4A and 4B depict example seamless desktops provided by the compositioning domain (e.g. as combined pixel information in a screen buffer). Referring to FIG. 4A, desktop 400a includes application windows 406a and 406b. 406a is a display of some pixel information extracted from domain 1, while 406b is a display of some pixel information extracted from domain 2. It is seen that application 406a partially overlaps application 406b, which carries forward the application stacking principle of modern operating systems, where 406a is partially 'on top' of application 406b. The locations of 406a and 406b, and their overlap, reflects the relative locations of application 1 (on the desktop in domain 1) and application 2 (on the desktop in domain 2). That is, the positionings of application 1, 106a on desktop 100a (FIG. 1A) and application 2, 106b on desktop 100b (FIG. 1B) are such that when they are translated to the desktop 400a, they partially overlap. The compositioning domain recognizes this and will prioritize which window should appear 'above' or on top of the other, i.e. which pixel information is to be user in the overlap region(s).

Prioritization of window order can be accomplished using any number of techniques. In one particular example, the compositioning domain tracks which domain is to be given 'focus'. The application that is 'on top' in the in-focus domain is the window that appears on top in the seamless desktop. Since applications from multiple domains are being displayed at the same time by the compositioning domain, the user should able to both view and interact with each of these applications. In an approach described herein, the compositioning domain maintains an in-focus domain state indicating which domain is currently in-focus. In the example of FIG. 4A, domain 1 is currently the in-focus domain, and application 406a of domain 1 is shown on top to enable the user to interact with that in-focus domain.

Additionally, other non-window "desktop elements" from the in-focus domain (domain 1 in FIG. 4A) can be brought into focus to enable the user to interact with those additional elements. Common desktop elements include one or more taskbars, system trays, desktop notifications, or desktop widgets or icons, as examples. Consequently, in FIG. 4A, since domain 1 is currently in-focus, taskbar 102a, including Start button 104a thereof (see FIG. 1A), is also presented to the user, i.e. as taskbar 402a and Start button 404a. It is important to note that taskbar 402a is merely the pixel information of taskbar 102a from domain 1. Taskbar 402a and taskbar 102a are not separate taskbars. Instead, the compositioning domain simply obtains and displays pixels of taskbar 102a from domain 1 on the basis that domain 1 has focus.

Another common desktop element is a desktop background or "wallpaper". The wallpaper of the in-focus domain can also be pulled into the MultiView domain and displayed wherever there is no overlying application window or other element to be displayed. In FIG. 4A, since domain 1 has focus, desktop 400a can appear to have the same background as the background of desktop 100a. Alternatively, the compositioning domain may wish to impose a separate one or more backgrounds for the seamless desktop, where instead of displaying the background of any of the underlying domains, the compositioning domain provides a separate, perhaps single solid color background, or multiple solid color backgrounds, each corresponding to a different domain, and being displayed according to which domain currently is the in-focus domain.

In the example of FIG. 4A, then, since domain 1 is currently in focus, almost all pixel information from domain 1's screen buffer is obtained and displayed, save for the areas of the desktop where pixels for application 2 (106b from domain 2) are to be displayed. Those pixels, which form substantially a rectangle with its top left corner removed in FIG. 4A, are filled with pixel information from domain 2. The constructed image is placed into the screen buffer for display to a user, as depicted in FIG. 4A.

Windows and other desktop elements can be tagged, labeled, highlighted, dimmed, transformed, brightened, tinted, or the like to facilitate usability of the seamless desktop. In one example, any windows or desktop elements that are part of the in-focus domain and that are to be at least partially displayed in the compositioning domain, are presented in their natural (clear) form, whereas windows or desktop elements from other domains can be made visually different but readable. In one example, a dimming effect is applied to those windows of other domains, and no desktop elements from those other domains are shown.

Various other approaches could be additionally or alternatively used to indicate the pixels of the in-focus domain vs. the out-of-focus domain(s) and information thereof. In one such approach, the compositioning domain superimposes graphics by replacing some of the pixel information obtained from the underlying domains with superimposed pixel information. This is possible because the compositioning domain handles assembly of the pixel information from the underlying domains and presentation of the screen buffer to the display device(s). Ultimately, the compositioning domain can place whatever pixel information it wishes into its own screen buffer which is the buffer containing the information that the user sees. Therefore, the compositioning domain can superimpose domain-identifying information. Part of the pixel information assembly may be to insert graphics that were not derived from the underlying domains but are instead inserted by the compositioning domain for usability or other purposes. For instance, a classification label can be placed at the top of the screen, drawn natively by the compositioning domain, to indicate which domain has focus. The label can be made to correlate to windows/elements from that in-focus domain. Thus, in one example, each domain may be assigned a different color, and windows or other elements taken from each domain and displayed on the seamless desktop could be given a border, tab, or any other visual indicator of the appropriate color to indicate which element or window belongs to (i.e. is taken from) which domain. A strip of the color assigned to the in-focus domain could be displayed at the top of the screen to indicate the in-focus domain.

FIG. 4B depicts the seamless desktop provided by the compositioning domain after the user has moved the mouse over application 2 and clicked. Desktop 400a now shows application 2 (406b from domain 2) with focus and being partially on top of application 1 (406a from domain 1). Other pixel information, not just the overlapping portion of application 406a and 406b, is updated as well, in this example. For instance, taskbar 402b is now the taskbar of domain 2, which includes the Go button 404b. Also in this example, a banner 408 is displayed. As described above, the banner could be a particular color or design that is made to correspond to domain 2, indicating domain 2 as the currently in-focus domain. If the user switches between domains, then the banner could be updated by way of a color change and/or changing text thereof to reflect the switch in domain focus.

Thus, in FIG. 4B, the majority of the pixel information in domain 2's screen buffer is extracted and presented in desktop view 400b. The exceptions are the pixel areas where application 1 is displayed instead (i.e. a rectangle with its bottom right corner cut out), and where banner 408 is superimposed by the third domain.

As noted, the compositioning domain maintains an in-focus domain state that indicates which domain is currently in-focus. In accordance with aspects disclosed herein, the in-focus state is leveraged to determine how to handle user input, for instance in order to further secure against cross-domain transfer of information.

When a user supplies input to a machine by way of some peripheral device, such as a keyboard or mouse, an input handler receives the input and routes it somewhere. In the case of virtual environments, the input handler (usually a component of the hypervisor) must know which guest machine should receive the user input. One approach is for the input handler to provide the user input to the compositioning domain, running as a guest machine, and allow the compositioning domain to supply that down to the appropriate domain's guest machine. A problem with this approach is that it opens up a hole for cross-domain transfer of information in that the compositioning domain is given the ability to write data (e.g. user input data) to the underlying domains. But, beyond this, the compositioning domain could also have the ability to write down other data, such as data that it extracts from any other domain. In this example, any extracted pixel information is subject to being written to another of the domains to which the compositioning domain could provide user input (which would likely be any application domain in the system). This approach violates aspects described herein, which provide that the compositioning domain should not be able to write down to any of the domains from which it extracts information, for security purposes.

Instead, in accordance with aspects disclosed herein, the compositioning domain maintains an in-focus domain state, which is provided to or accessed by the input handler in the hypervisor. The input handler then uses this state to determine which domain is the in-focus domain, and provides the user input to the indicated in-focus domain. The in-focus domain state, therefore, dictates which domain is to receive user input. The input handler interrogates the in-focus domain state maintained by the compositioning domain to determine which domain should receive the user input. Based on the indication, the input handler sends the input to the proper domain. Notably, the user input is not written to the compositioning domain for provision to the target domain. Instead, the user input is routed directly from the input handler to the identified underlying virtual machine, and this provides important security benefits.

Consider an example where a user invokes a Print Screen copy of the screen buffer to the clipboard (this facility is available by double tapping the PrtScr/PrintScreen key for some operating systems). According to aspects described herein, the input is routed from the input handler directly to the in-focus domain (as opposed to a compositioning domain, for instance). The input keystrokes cause a copy, in the in-focus domain, of the screen buffer of the in-focus domain to the clipboard of the in-focus domain (assuming this Print Screen capability is provide in the underlying in-focus domain). The user then attempts to paste that data by invoking other input, such as a Ctrl-V keystroke combination. That input is again routed to the domain that is in-focus at the time of the paste. Two cases are therefore possible in this situation: either the in-focus domain has been changed between the PrtScr copy and the Ctrl-V paste, or it has not been changed. In both cases, no copied information (from domain 1) is transferred out of domain 1. In the first case, a switch was made of the in-focus domain, from a first domain to a second domain. Thus, when the paste (Ctrl-V) is invoked, it is provided to the second domain, because of the focus switch between the first and the second domains. Because the paste is routed to the second domain, it will paste contents (if any) of the clipboard of the second domain into whatever application has focus in the second domain. No paste of information will have occurred in the first domain because it did not receive that user input. The screen copy invoked to the first domain has no connection to the paste that occurs in the second domain, and no transfer of data between domains has occurred.

Alternatively, in the second case, where there is no focus switch to a different domain, then the paste (Ctrl-V) will be routed to the first domain and this will paste, in the first domain, the screen buffer (of the first domain) that was copied by the Print Screen. No data has transferred away from the first domain in either case, since the copied data remains in the first domain. Additionally, it should be noted that since the input to perform the screen copy is routed to the first domain, the screen buffer that is copied is that of the first domain, not that of the compositioning domain. The copied data, therefore, includes only the desktop view of the first domain, which may look very different from what the compositioning domain is outputting on the user's display. In this manner, though the user may think that a copy occurs of the screen buffer of the compositioning domain that the user sees, this is not the case because the input handler routes the user input down to the first domain.

Figure 5:
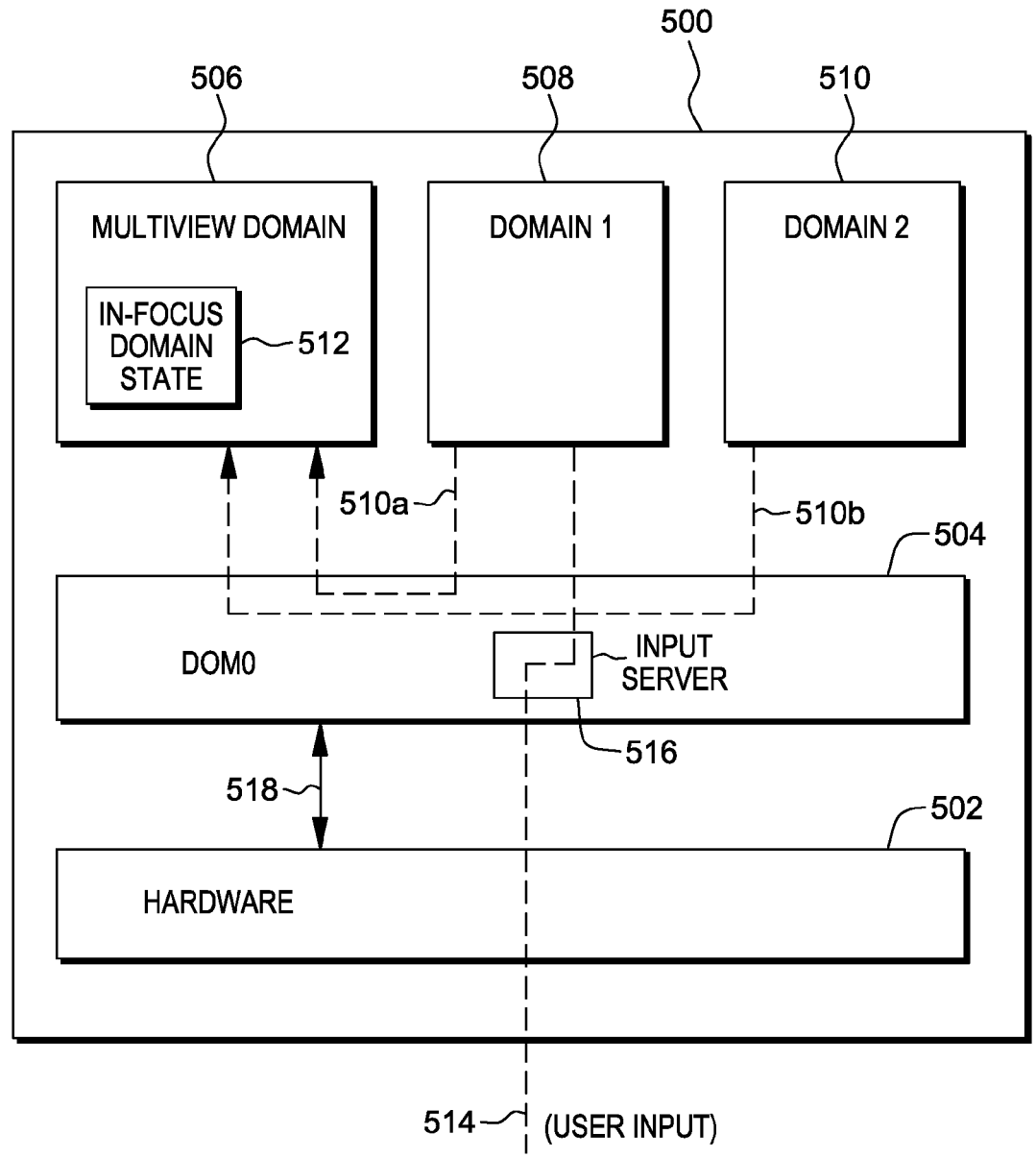
FIG. 5 schematically illustrates domain separation and communication within a data processing system executing multiple domains, in accordance with aspects described herein.

Aspects of this domain separation and communication between domains are described and depicted with reference to FIG. 5. FIG. 5 schematically illustrates domain separation and communication within a data processing system executing multiple domains. In FIG. 5, data processing system 500 is shown having hardware 502 which includes the hardware resources of the system, such as processor(s), memory, I/O devices, etc. A hypervisor (Dom0) 504 executes on processor(s) of hardware 502 and communicates with hardware 502 over one or more communication paths 518. Hypervisor 504 'hosts' guest environments, in this case guest virtual machines each running a respective domain, i.e. domain 506—the MultiView domain—and domains 508 and 510, the first and second domains, respectively. MultiView domain 506 reads pixel data from domains 508 and 510 via read-only communication paths 510a and 510b. These read-only paths are controlled by hypervisor 504 in the sense that hypervisor 504 is responsible for preventing attempts to write to domain 508 or domain 510 by MultiView domain 506. That is, hypervisor 504 is configured to prohibit, by way of hardware capabilities in one example, such as virtual machine extension technology, domain 506 from writing data to domains 508 or 510.

The MultiView domain 506 maintains in-focus domain state 512, indicating for hypervisor 504 the domain (506 or 510) to which user input is to be directed. More specifically, incoming user input 514 is handled by an input server 516 of hypervisor 504. Hypervisor 504 (and/or input server 516 thereof) obtains an indication of the in-focus domain state 512 maintained by the MultiView domain 506. The user input is then provided by the input server to the indicated in-focus domain—in this example domain 508. Advantageously, by providing user input directly to the appropriate underlying domain, rather than, for instance, passing the input to the MultiView domain and permitting the MultiView domain to write that input to the appropriate domain, there is no need for the MultiView domain to perform data labeling, copying, cutting or pasting, etc.

In one example, hypervisor 504 comprises a modified version of a commercially-available hypervisor, such as the Xen® hypervisor. The modifications include a configuration of the hypervisor to check the in-focus domain state of the MultiView domain and provide user input directly to the indicated in-focus domain, rather than, for instance, providing the user input to the MultiView domain.

By the above approach, user input (for instance mouse movement or typing on a keyboard), is sent directly from the input handler to the in-focus domain instead of being sent to the compositioning domain. Mouse input is sent as mouse input to the in-focus domain, and consequently the in-focus domain will treat it as mouse input in that domain (e.g. the mouse will move accordingly, or a mouse button-down event will be received as if the user clicked a mouse button in the in-focus domain, as examples).

When a user interacts with, e.g., an email client window that is part of in-focus domain 2 by moving the mouse over the list of emails in the email client, the pixel information for domain 2 (being placed into domain 2's screen buffer and brought into and displayed by the compositioning domain) changes because the mouse being drawn in domain 2 is being moved. The compositioning domain rapidly refreshes its screen buffer with updated pixel information obtained from domain 2, and therefore will draw that updated pixel data for the user in the display of the compositioning domain. The mouse movement seen in the compositioning domain is therefore actually mouse movement—and more basically, merely changes in pixel information—occurring in domain 2.

Similarly, when the user composes a new email, that keyboard input is sent to the in-focus domain which will be the domain in which the new email is being composed. The user sees the characters being drawn on the screen, which, as above, is merely a change in pixel information obtained from the in-focus domain. The changed pixel data in the in-focus domain is read by the compositioning domain, and the compositioning domain draws those changes on the display being presented to the user by updating the pixel information in the compositioning domain's screen buffer. The user is typing in the in-focus domain all along.

When a user interacts (mouse/keyboard input) with a particular application, the domain in which that application executes will be the in-focus domain. If the user wishes to interact with another application, perhaps of another domain, the user will typically mouse over to the window of the other application, click, and begin further interaction. The compositioning domain is able to handle this procedure. In one embodiment, the compositioning domain monitors the mouse movement input to detect when the mouse is being moved outside of any pixel information that is not part of the domain with focus. In this regard, the compositioning domain can be given (e.g. by the input server) the mouse location when particular mouse-related events (such as a mouse click) occur. Since the compositioning domain cannot send information to the underlying domains, this is not in violation of the security aspects described above; mouse event information can safely be provided by the input server to the compositioning domain since the compositioning domain has no way to write that information down to the other domains. When it is detected that the mouse is being moved across an interface between pixel information of domain 1 and pixel information of domain 2, the input will be sent to the compositioning domain for handling. To effect this change, the compositioning domain could, for example, switch the in-focus domain state to indicate itself, changing the focus to the compositioning domain, so that user input (such as a mouse click) would be both observed and handled by the compositioning domain. In this case, the compositioning domain could observe where in the display (the compositioning domain screen buffer) the user clicked, determine which particular domain's pixel data is displayed at that location, and change the in-focus domain state to indicate that particular domain. This procedure would be common when the user moves to another window of a different domain than the in-focus domain and clicks to bring that window 'to the top' of the compositioning domain desktop.

In one example, the compositioning domain superimposes at least a portion of a mouse icon to replace the mouse icon that is being drawn in the in-focus domain, as the mouse cursor moves outside of pixel information of the in-focus domain. As the user moves the mouse across the interface between information (such as a window edge) of the in-focus domain and information of a different domain, the compositioning domain can superimpose a mouse icon or portion thereof to make it appear as though the mouse icon overlays the underlying domain pixels. The compositioning domain, at that point, can receive the user input to detect where the user is moving the mouse and then give focus to the domain over which the cursor is positioned once the mouse has been moved completed across the interface. Thus, in one example, when the user has moved the mouse far enough that the icon appears completely within the different domain, then the MultiView domain can automatically switch the in-focus state to indicate the different domain as being the in-focus domain.

Alternatively, instead of causing the automatic focus switch when a user moves the mouse over information from a second domain, the compositioning domain can continue to draw a superimposed mouse icon until the user has clicked a mouse button to select the information of the second domain (e.g. has clicked in a window of the second domain, causing a switch in focus to indicate the second domain as having focus). At that point, the selected window on which the user clicked can be brought to the top by displaying all pixels of that selected window and discarding the pixels of any windows overlapping the selected window. Additionally, the mouse-click information can be sent to the second domain so that the second domain can select that window to give it focus. The mouse event information is given to the second domain because the act of clicking the window causes the domain that that window belongs to receive focus. Accordingly, each time the user clicks the mouse, a check is made as to which window was clicked, and it is determined which domain the window belongs to. Then, focus is given to that domain, which in turn causes the mouse information to go to that domain. User input from that point is provided to the in-focus domain (e.g. the second domain). In one example, each domain uses "absolute positioning" so the mouse cursors are always in sync.

A method to determine which domain to send the mouse events is therefore provided. In an aspect described herein, the compositioning domain switches mouse input (by indicating the in-focus domain to the input handler) between the domains based on where the mouse is on the screen. Windows are not always square or rectangular objects for which it is relatively easy to determine whether the mouse position is part of that window. Oddly shaped and/or partially transparent graphics, as examples, present unique situations. In these cases, various approaches could be used to determine where the mouse is on the screen (i.e. which underlying domain element the mouse is actually positioned 'over').

As described above, the compositioning domain assembles pixel information into a screen buffer from at least some pixel information obtained from underlying domains. Due to the speeds and amount of data involved, this process can be very taxing from a computational resource standpoint. If two underlying domains are present, each with its own frame buffer, and at typical desktop resolutions and refresh rates, then upwards of 1 to 2 GB of data might be passing through the screen buffers of those domains each second (40 frames per second is typical). Thus, a significant amount of data is eligible for extraction by the compositioning domain, and the mathematics involved can be demanding. Consequently, in one aspect, the compositioning domain can be configured so that it intelligently extracts only the pixels that need to be updated. For instance, initially, it can be configured to account only for the number of pixels equal to the size of the display being used. From there, only the pixel information that is being used in the current display (screen buffer) of the MultiView domain needs to be updated. As an example, assume the user works with a web browser in domain 1 and email client in domain 2, and that the email client overlaps 90% of the web browser window. The pixel information of that 90% of the web browser window need not be updated in the display being assembled in the compositioning domain, regardless of whether it is being updated in domain 1, because the email client window covers, in the compositioning domain, that portion of the web browser window. Consequently, the compositioning domain can read-out only the portion of each domain's screen buffer that is actually visible to the user in the compositioning domain's display at any given time. This helps to manage the amount of mathematics and processing involved when dealing with many domains.

In one particular approach, the compositioning domain uses region subtraction to determine which pixel information from each of the underlying screen buffers should be obtained. In this approach, for a given screen buffer of an underlying domain, the compositioning domain subtracts (i.e. does not read) pixel information from that buffer for any region of the buffer containing pixels that will be filled with pixel information from another domain. This is repeated for each domain. Thus, using the example of FIG. 4B, the compositioning domain will recognize when reading the screen buffer of domain 1 (having application 406a) that the pixels of domain 1 surrounding application 1's window will not be displayed by the compositioning domain, and instead those pixels will be drawn from pixel information of domain 2. So, only pixel information of application 406a from domain 1 will be read. In this case, the pixel information that is extracted will not include the bottom right corner of application 406a because that will be 'overlapped' by application 2 (406b). The compositioning domain will read domain 2's buffer and obtain the pixel information thereof, except the pixel information for pixels that will be replaced with the pixels of application 406a. In addition, the pixel information for the pixels where banner 408 is displayed will also be ignored by the compositioning domain in reading the pixel information from domain 2. In this manner, pixel information is selectively read from the domain screen buffers.

The compositioning domain additionally tracks any 'stacking' of windows that occurs. In FIG. 4B, the compositioning domain will track that application 406b is supposed to display as overlapping (at least partially) application 406a. The compositioning domain maintains a global "z-order" by keeping track of the order of windows in each underlying domain (via window state change updates, for instance) and also by keeping track of the order in which the user clicks through windows in the compositioning domain. In one example, the Multi-View domain receives at least some cursor events, like button-1 down, each time the event occurs, and the global z-order is tracked based on this.

Figure 6A:
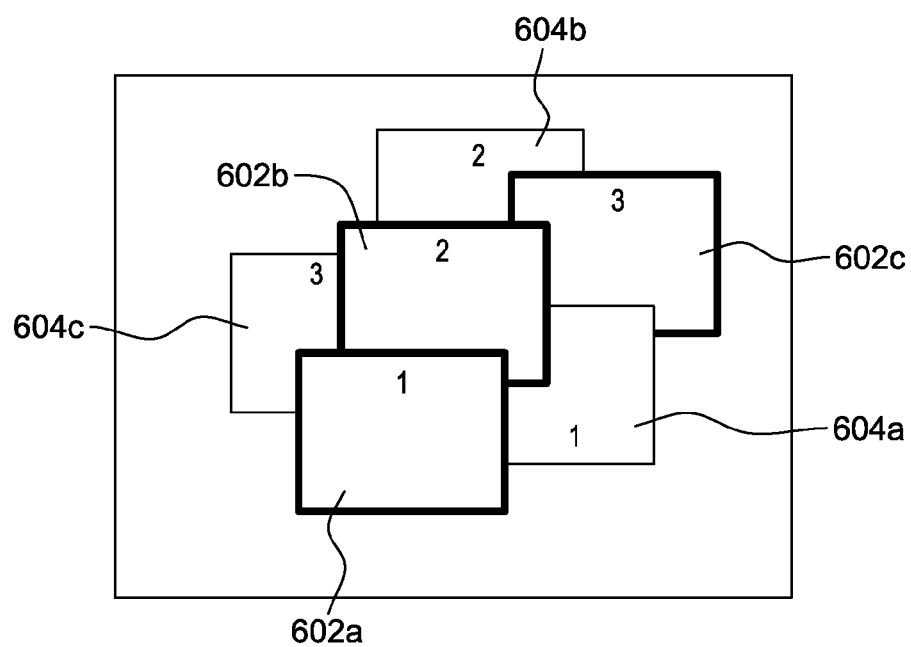
FIG. 6A-6B illustrate window ordering in a stack of application windows from multiple underlying domains; in accordance with aspects described herein.
Figure 6B:
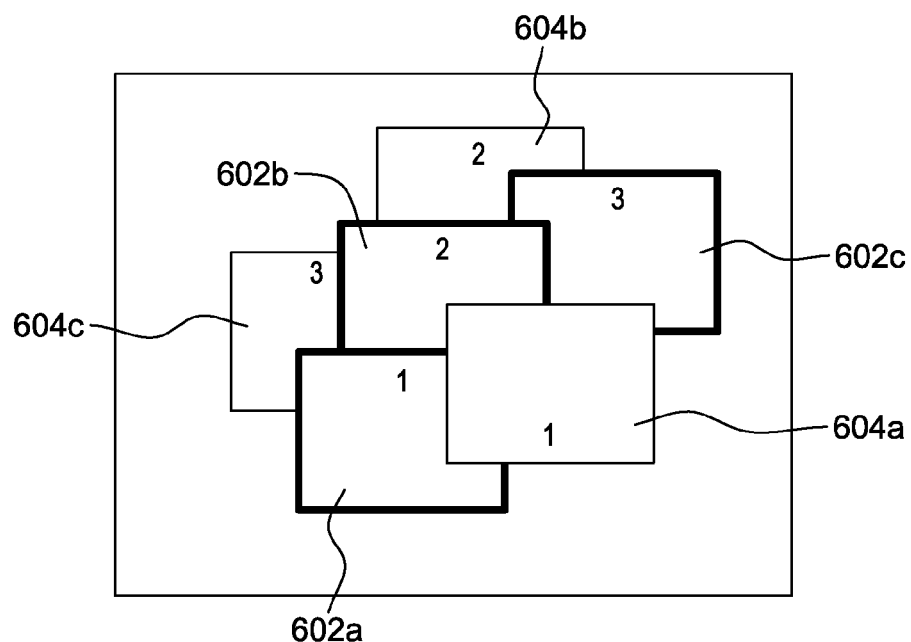

FIGS. 6A-6B illustrate window ordering in a stack of application windows from multiple underlying domains. In FIG. 6A, applications 602a, 602b, and 602c (depicted having heavy borders) are applications of domain 1 and applications 604a, 604b, and 604c are applications of domain 2. Application 602a from domain 1 is "on top", both on the seamless desktop of the compositioning domain, and also on domain 1's desktop. Application 602b is on top of application 602c in domain 1's desktop, but application 604a (of domain 2) is on top of application 602c of domain 1 in the seamless desktop. To summarize, the window stacking order of the applications for domain 1, domain 2, and the compositioning domain are as follows (from top to bottom):

Domain 1: 602a, 602b, 602c
Domain 2: 604a, 604b, 604c
Compositioning domain: 602a, 602b, 604a, 602c, 604b, 604c.

FIG. 6B depicts the situation when a user clicks on application 604a of domain 2. There is no order change on the desktop of domain 1, since application 604a is not part of domain 1. There also is no order change (in this example) on the desktop of domain 2, since application 604a was already on top in that desktop. However, within the compositioning domain, application 604a is brought to the top, i.e. now above all of the other applications in the seamless desktop. Since there is no window state change reported in domain 1 when the user clicks on that window, the compositioning domain maintains the global z-order to know that application 604a was clicked. The compositioning domain receives at least some cursor events, like button-1 down, each time the event occurs, and the global z-order is tracked based on the order in which the windows navigated. In one example, a stack is maintained, and when a new window is brought to the top, an indication of that is put on top of the stack.

When no applications are open in any domain being displayed in the compositioning domain, functionality is provided that nevertheless enables a user to switch between domains (for instance to enable the user to switch into the domain in which the user wishes to launch the first application). Thus, in some embodiments, a separate interface can be provided upon detection that a predetermined event, such as a mouse click on a superimposed interface or upon detecting a particular keypress combination, as examples. The separate interface can be provided by its own underlying domain and present for the user a text and/or graphical based list of the different domains being displayed in the compositioning domain, and allow the user to select the domain which is to be given focus, to thereby bring the taskbar and/or other desktop elements of that domain into focus for user interaction therewith. In one embodiment, the user can use a keyboard combination to cycle through the domains. Additionally or alternatively, the compositioning domain can be configured to detect particular mouse gestures, like movement of the mouse to one corner of the screen, to invoke display of the separate interface for the user.

The separate interface can be designed in any manner that is convenient from a usability standpoint (using text, graphics, or a combination thereof). Each domain can have settings associated therewith, such as a unique icon, status, color, etc. Additional domain settings can provide an interface to perform other functions for the domain, such as to alter its execution state (shut down, reboot, sleep, etc), select which peripheral devices are passed through (down to the domain), including keyboard, mouse, USB-attached devices such as storage drives, and printers, as some examples. The settings can also indicate the virtual and physical network devices associated with the domain.

The separate interface can also provide an interface for viewing/adjusting settings above and/or settings for the compositioning domain itself. Settings for the compositioning domain include the execution state of the compositioning domain (running, shut down, sleep, reboot, etc.), and the display configuration, including settings to configure the number and resolution of the display(s) across which the screen buffer of the compositioning domain is to be displayed.

Accordingly, provided herein are methods for facilitating interaction with multiple domains in which applications execute. An example such process is depicted and described with reference to FIG. 7. In one example, a compositioning domain facilitates interaction between a user and the multiple domains that execute as separate execution environments for executing their respective applications. The compositioning domain facilitates interaction between the user and the multiple domains in a secure manner in which cross-domain transfer of data is prevented.

Figure 7:
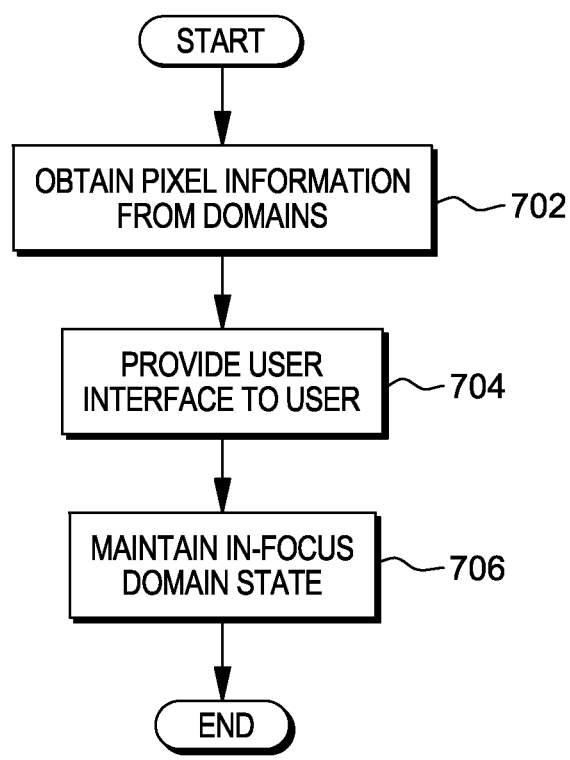
FIG. 7 depicts an example process for facilitating interaction with multiple domains in which applications execute; in accordance with aspects described herein.

The process of FIG. 7 begins by obtaining pixel information from the multiple domains (702). In one example, the compositioning domain obtains the pixel information via a read-only communication path and from a display buffer of each domain of the multiple domains.

Next, a user interface is provided to the user (704), which includes the compositioning domain providing a display buffer that aggregates at least some of the pixel information obtained from each of the multiple domains, for display to the user. In one particular example, the obtained pixel information is extracted pixel information of one or more graphical user interface elements, such as windows, of a first domain, from the display buffer of the first domain, and extracted pixel information of one or more graphical user interface elements, such as windows, of a second domain, from the display buffer of the second domain. The extracted pixel information is provided to the display buffer of the compositioning domain for output to the user via at least one display device.

In some embodiments, as part of the provision of the user interface, pixel information is added to the pixel information obtained from the domains, and the added pixel information adds pixels to the display buffer of the compositioning domain. The added pixels can identify the elements as being from their respective domains, for instance can identify window(s) from a first domain as being from the first domain, and identify window(s) from a second domain as being from the second domain.

Continuing with FIG. 7, the process further includes maintaining an in-focus domain state indicating which domain of the multiple domains is currently in-focus (706). Input from the user, based on the user interface being provided to the user, is provided by a user input handler directly to the currently in-focus domain indicated by the in-focus domain state, and is provided thereto absent transfer of the user input to the compositioning domain, which avoids transfer by the compositioning domain of the input down to the multiple domains.

Figure 8:
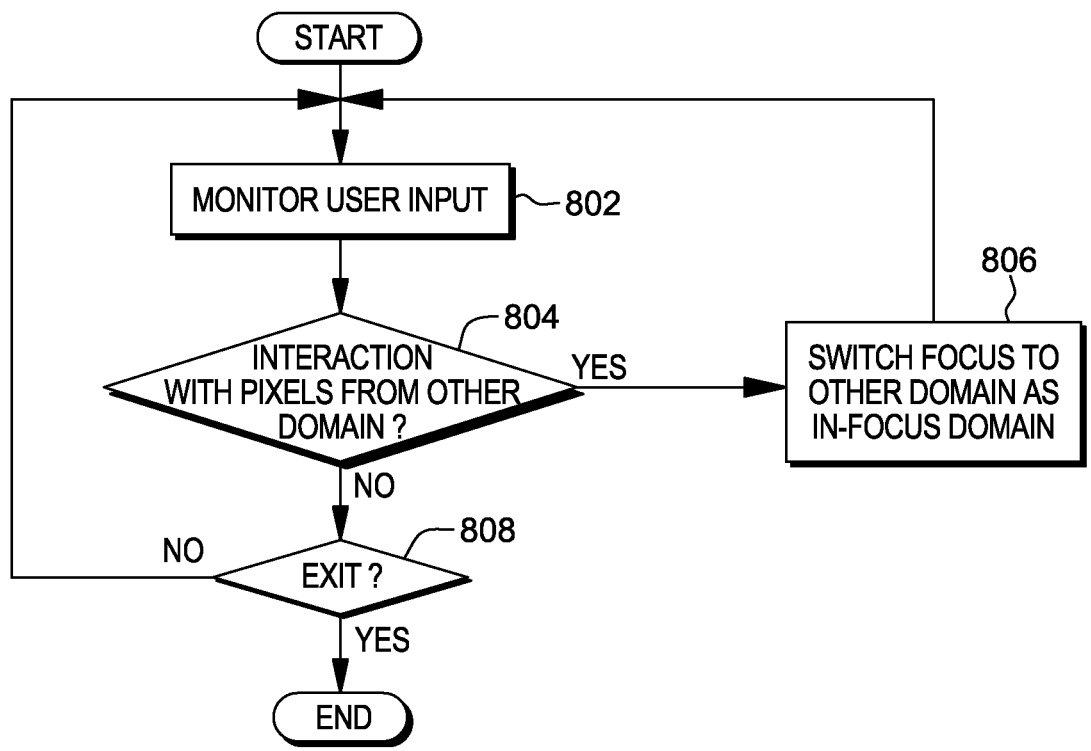
FIG. 8 depicts an example process for maintaining an in-focus domain state, in accordance with aspects described herein.

An example process for maintaining an in-focus domain state is provided with reference to FIG. 8. The process includes monitoring the user input (such as mouse movements, gestures, etc., or other user input) from the user (802), for instance to detect interaction with pixels/pixel information from a domain other than the currently in-focus domain. Thus, it is determined whether interaction with pixels from another domain (not the in-focus domain) has occurred (804). If so, then based on detecting that interaction with pixels/pixel information from the other domain, the compositioning domain can switch focus to the other domain as the in-focus domain (806). That is, it can modify the in-focus domain state to indicate the other domain. Based on the switch in focus to the other domain as the in-focus domain, user input from the user is provided by the user input handler directly to the other domain. After switching the focus, the process loops back to (802) where user input continues to be monitored.

If instead, at 804 it is determined that interaction was not with pixel information from another domain, then the process continues by determining whether to exit (808). For instance, the process may receive an indication that the compositioning domain is shutting down or pausing, in which case the monitoring routine may be exited. If it is determined not to exit, then the process continues back to (802) to continue monitoring user input.

In some embodiments, the compositioning domain, and the multiple other domains execute as separate guest machines of a hypervisor. The hypervisor can include as a component thereof the user input handler, and therefore the user input handler is not a part of any of the guest machines (e.g. the compositioning domain or the other guests). The hypervisor can be responsible for preventing write access between guest machines, and more specifically preventing write access by the compositioning domain guest machine to the guest machines for the first and second domain. The hypervisor may, for instance, control access to guest machine memory pages by marking memory pages of each guest machine read-only by the compositioning domain guest machine.

The hypervisor or component thereof, e.g. the user input handler thereof, can access, read, obtain, interrogate, query, etc. the in-focus domain state being maintained by the compositioning domain to determine the guest machine that is to be provided the user input. The user input handler, in one example, is the component to which all user input is initially routed from the I/O interfaces when received from a user. Based on the hypervisor preventing write access to the domain guest machines by the compositioning domain guest machine, and based on directly providing the user input to the guest machine of the in-focus domain, transfer of data between the domain guest machines and the compositioning domain guest machine is prevented.

Aspects of the above can be delivered as a secure domain facility that leverages hardware-enabled technology that ensures a trusted execution environment for the secure domain facility. Examples of such hardware-enabled technology include Hardware Dynamic Root of Trust Measurement (H-DRTM) technologies such as the Trusted Execution Technology (TXT) (offered by Intel Corporation, Mountain View, Calif.) and SKINIT (offered by Advanced Micro Devices, Sunnyvale, Calif.). Intel TXT is provided, in some examples, as part of Intel's vPro hardware technologies collection. By running the secure domain facility within a trusted execution environment, additional assurances are provided that the secure domain facility itself is not compromised.

Figure 9:
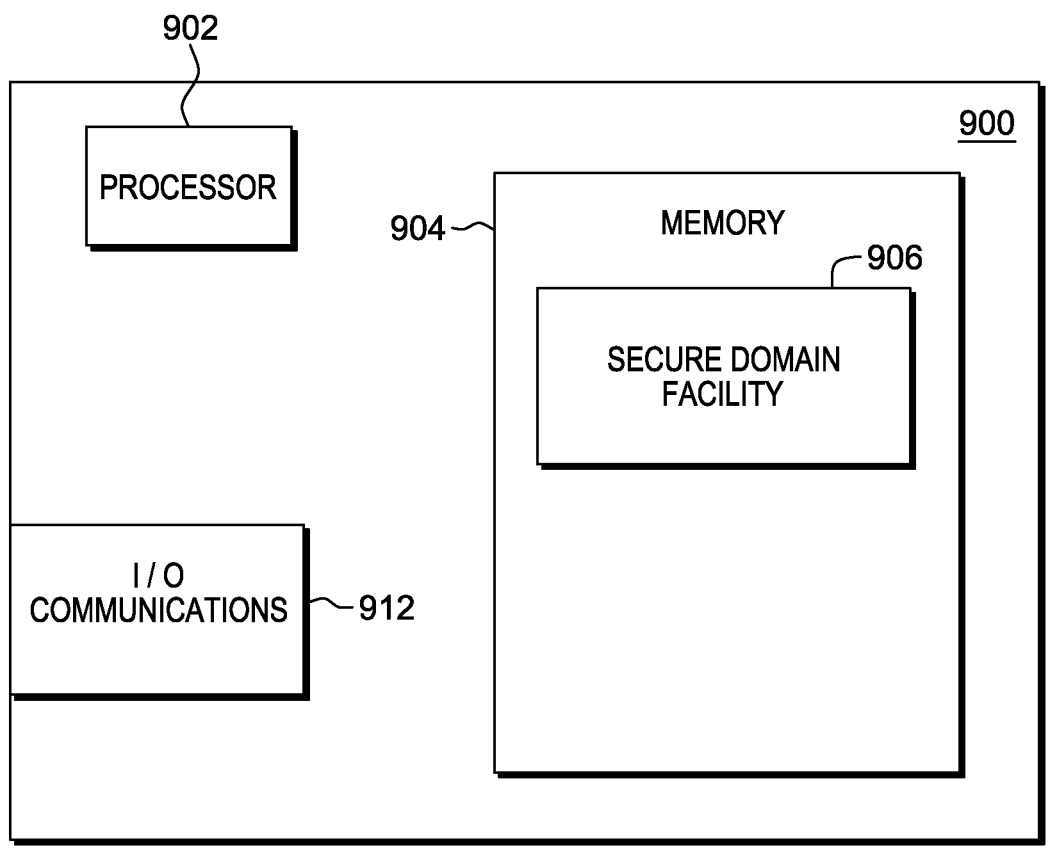
FIG. 9 depicts one example of a system incorporating aspects described herein.

FIG. 9 depicts one example embodiment of a system incorporating aspects described herein, specifically a secure domain facility. In one example, the secure domain facility includes software for execution to perform aspects described herein. This software includes, in some embodiments, a hypervisor configured in accordance with aspects described herein, as well as a guest machine that executes to perform functions of the compositioning domain described herein. Data processing system 900 includes a processor 902 and memory 904. Processor 902 comprises any appropriate hardware component(s) capable of executing one or more instructions from memory 904. Memory 904 includes secure domain facility 906 that executes to perform/provide facilities described herein, such as hypervisor code and code for executing a guest machine to provide the compositioning domain. Additionally, memory 904 can include other guest machines and/or virtual environments and facilities thereof (not pictured) for execution to provide the desktops of the underlying domains seamlessly integrated for the user by the compositioning domain of the secure domain facility 906.

Further, data processing system 900 includes an input/output (I/O) communications interface component 912 for communicating data between data processing system 900 and external devices, such as I/O and peripheral devices (mouse, keyboard, display devices) and network devices. In another embodiment, data processing system 900 comprises a universal serial bus (USB) or peripheral component interconnect (PCI) device, in which case I/O communications interface component 912 comprises, respectively, a USB or PCI adapter configured to couple to a USB or PCI port of the computing platform.

For data processing systems that do not have hardware-enabled technology that ensures a trusted execution environment, a "late-launch" version of the secure domain facility can be provided on a peripheral device, such as a USB device, that is capable of providing a trusted execution environment. Example such devices are described in U.S. patent application Ser. No. 13/435,015, filed Mar. 30, 2012, entitled "TRUST VERIFICATION OF A COMPUTING PLATFORM USING A PERIPHERAL DEVICE", which is hereby incorporated herein by reference in its entirety. Thus, even though a particular Intel-architecture based data processing system does not include Intel's TXT technology, for instance, a trusted execution environment can nevertheless be provided for the secure domain facility. Advantageously, this provides usability of the secure domain facility on modern, already deployed systems, absent the need for dedicated hardware support for a trusted environment (such as Intel's TXT), and absent additional installation or modification to the system.

Figure 10:
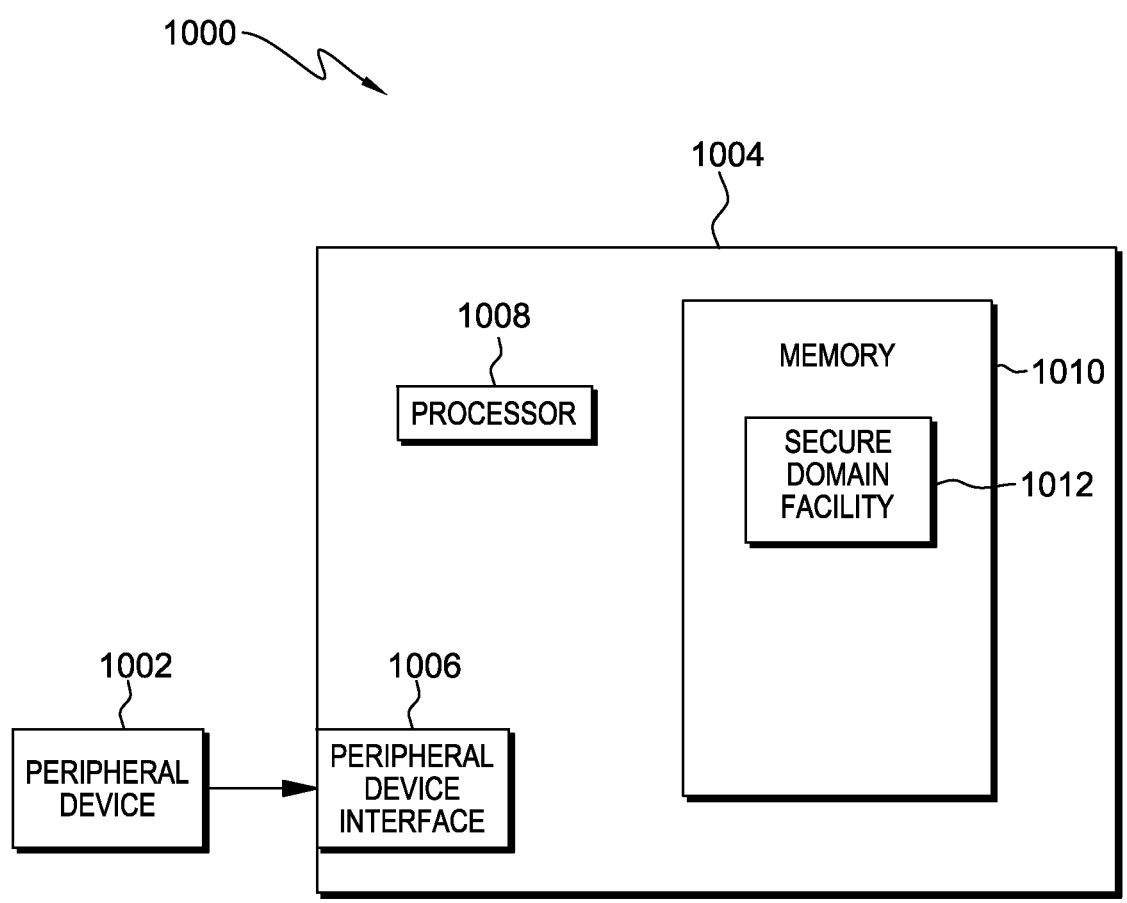
FIG. 10 depicts another example of a system incorporating aspects described herein.

FIG. 10 depicts another example of a system incorporating aspects described herein. System 1000 includes a data processing system 1004, having processor(s) 1008 and memory 1010, as above. In this example, data processing system does not have hardware-enabled technology that ensures a trusted execution environment. This facility is therefore provided, along with a secure domain facility, by peripheral device 1002. In one example, peripheral device 1002 is a USB device that couples to a peripheral device interface 1006 of data processing system 1004. Peripheral device 1002 includes, for instance, a microcontroller or other processor, and a read-only flash memory storing program code to establish a root of trust on data processing system 1004, and also storing the secure domain facility. After the peripheral device is used to establish a root of trust on data processing system 1004, the peripheral device can provide the secure domain facility 1012 to data processing system 1004, which stores the secure domain facility 1012 in memory 1010. The integrity of the secure domain facility 1012 stored in memory 1010 can also be verified prior to its execution by processor(s) 1008. Additionally, memory 1010 can include other guest machines and/or virtual environments and facilities thereof (not pictured) for execution to provide the desktops of the underlying domains seamlessly integrated for the user by the compositioning domain of the secure domain facility 1012.

Described herein are facilities for providing a secure environment in which multiple domains are executed, in some embodiments on the same hardware, and wherein cross-domain transfer of information from those domains is prevented. Applications from multiple domains are seamlessly combined and provided as part a single user interface. Advantageously, seamless windowing is provided which allows windows of applications from different information domains to be viewed and manipulated contemporaneously on a single display.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 11:
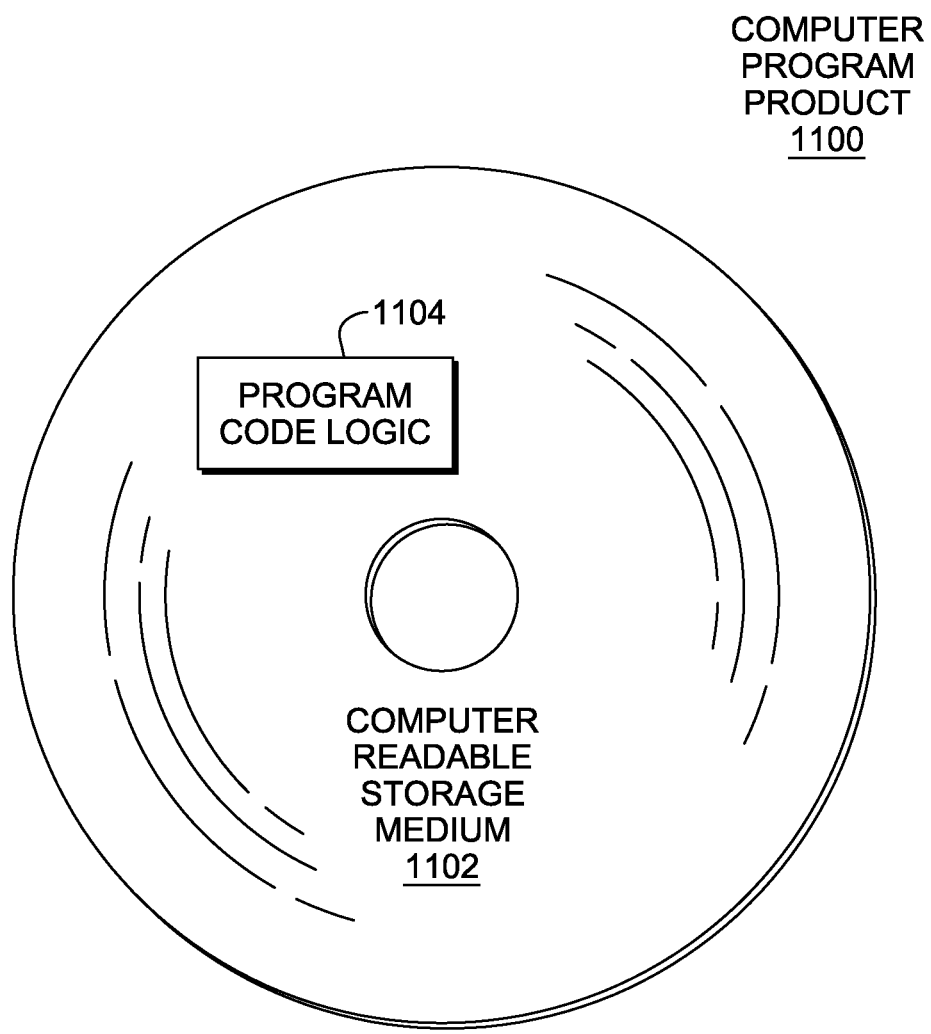
FIG. 11 depicts one example of a computer program product to incorporate aspects described herein.

Referring now to FIG. 11, in one example, a computer program product 1100 includes, for instance, one or more computer readable media 1102 to store computer readable program code means or logic 1104 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method for facilitating user interaction with multiple domains in which applications execute, the method comprising:
    providing a compositioning domain executing on a processor as a guest machine above a hypervisor, the compositioning domain to facilitate interaction between a user and at least two domains in which applications execute, the at least two domains executing as separate execution environments for executing their respective applications, wherein the compositioning domain facilitates interaction between the user and the at least two domains in a secure manner preventing cross-domain transfer of data, and wherein the facilitating interaction comprises:
        obtaining by the compositioning domain pixel information from the at least two domains via one or more read-only communication paths that are read-only from the compositioning domain to the at least two domains, the obtained pixel information comprising at least some pixel information from each domain of the at least two domains, wherein pixel information obtained from one domain of the at least two domains differs from pixel information obtained from another domain of the at least two domains;
        providing a user interface to the user, the providing comprising providing a display buffer of the compositioning domain, the display buffer comprising the obtained pixel information including the at least some pixel information from each domain of the at least two domains for simultaneous display of the at least some pixel information from each domain of the at least two domains to the user; and
        maintaining an in-focus domain state indicating which domain of the at least two domains is currently in-focus, wherein user input from the user based on the user interface is provided by a user input handler directly to the currently in-focus domain indicated by the in-focus domain state, absent transferring the user input to the compositioning domain.

2. The method of claim 1, wherein the compositioning domain obtains the pixel information from a respective display buffer of each domain of the at least two domains via the one or more read-only communication paths.

3. The method of claim 2, wherein obtaining the pixel information comprises extracting first pixel information of one or more graphical user interface windows of the first domain from the display buffer of the first domain and extracting second pixel information of one or more graphical user interface windows of the second domain from the display buffer of the second domain.

4. The method of claim 3, wherein providing the user interface further comprises providing at least some of the first extracted pixel information and at least some of the second extracted pixel information to the display buffer of the compositioning domain for simultaneous output thereof to the user via at least one display device.

5. The method of claim 2, wherein providing the user interface further comprises adding pixel information to the obtained pixel information from the at least two domains, wherein the added pixel information adds pixels to the display buffer of the compositioning domain to identify the window from the first domain as being from the first domain, and to identify the window from the second domain as being from the second domain.

6. The method of claim 1, wherein maintaining the in-focus domain state comprises monitoring the user input from the user to detect interaction with pixels from a domain other than the in-focus domain, and wherein, based on detecting interaction with pixels from the other domain, the compositioning domain switches focus to the other domain as the in-focus domain.

7. The method of claim 6, wherein, based on the switch in focus to the other domain as the in-focus domain, user input from the user is provided by the user input handler directly to the other domain.

8. The method of claim 1, wherein the compositioning domain executes as one guest machine above the hypervisor and the at least two domains execute as at least two additional guest machines above the hypervisor separate from the one guest machine.

9. The method of claim 8, wherein the user input handler is of a component of the hypervisor.

10. The method of claim 8, wherein the hypervisor prevents write access for the one guest machine to the at least two additional guest machines by indicating that memory pages of each guest machine of the at least two additional guest machines are read-only by the one guest machine.

11. The method of claim 10, wherein the user input is directly provided to the guest machine of the in-focus domain, and wherein, based on preventing the write access to the at least two additional guest machines, and based on directly providing the user input to the guest machine of the in-focus domain, transfer of data between the at least two additional guest machines is prevented.

12. A system for facilitating user interaction with multiple domains in which applications execute, the system comprising:
    a memory; and
    a processor in communication with the memory, wherein the system is configured to perform a method comprising:
        providing a compositioning domain executing on a processor as a guest machine above a hypervisor, the compositioning domain to facilitate interaction between a user and at least two domains in which applications execute, the at least two domains executing as separate execution environments for executing their respective applications, wherein the compositioning domain facilitates interaction between the user and the at least two domains in a secure manner preventing cross-domain transfer of data, and wherein the facilitating interaction comprises:

obtaining by the compositioning domain pixel information from the at least two domains via one or more read-only communication paths that are read-only from the compositioning domain to the at least two domains, the obtained pixel information comprising at least some pixel information from each domain of the at least two domains, wherein pixel information obtained from one domain of the at least two domains differs from pixel information obtained from another domain of the at least two domains;

providing a user interface to the user, the providing comprising providing a display buffer of the compositioning domain, the display buffer comprising the obtained pixel information including the at least some pixel information from each domain of the at least two domains for simultaneous display of the at least some pixel information from each domain of the at least two domains to the user; and maintaining an in-focus domain state indicating which domain of the at least two domains is currently in-focus, wherein user input from the user based on the user interface is provided by a user input handler directly to the currently in-focus domain indicated by the in-focus domain state, absent transferring the user input to the compositioning domain.

13. The system of claim 12, wherein the compositioning domain obtains the pixel information from a respective display buffer of each domain of the at least two domains via the one or more read-only communication paths.

14. The system of claim 13, wherein obtaining the pixel information comprises extracting first pixel information of one or more graphical user interface windows of the first domain from the display buffer of the first domain and extracting second pixel information of one or more graphical user interface windows of the second domain from the display buffer of the second domain, and wherein providing the user interface further comprises providing at least some of the first extracted pixel information and at least some of the second extracted pixel information to the display buffer of the compositioning domain for simultaneous output thereof to the user via at least one display device.

15. The method of claim 13, wherein providing the user interface further comprises adding pixel information to the obtained pixel information from the at least two domains, wherein the added pixel information adds pixels to the display buffer of the compositioning domain to identify the window from the first domain as being from the first domain, and to identify the window from the second domain as being from the second domain.

16. The system of claim 12, wherein maintaining the in-focus domain state comprises monitoring the user input from the user to detect interaction with pixels from a domain other than the in-focus domain, wherein, based on detecting interaction with pixels from the other domain, the compositioning domain switches focus to the other domain as the in-focus domain, and wherein, based on the switch in focus to the other domain as the in-focus domain, user input from the user is provided by the user input handler directly to the other domain.

17. The system of claim 12, wherein the compositioning domain executes as one guest machine above the hypervisor and wherein the at least two domains execute as at least two additional guest machines above the hypervisor separate from the one guest machine.

18. The system of claim 17, wherein the hypervisor prevents write access for the one guest machine to the at least two additional guest machines by indicating that memory pages of each guest machine of the at least two additional guest machines are read-only by the one guest machine, wherein the user input is directly provided to the guest machine of the in-focus domain, and wherein, based on preventing the write access to the at least two additional guest machines, and based on directly providing the user input to the guest machine of the in-focus domain, transfer of data between the at least two additional guest machines is prevented.

19. A computer program product comprising:
a non-transitory storage medium storing program instructions readable by a processor for execution to perform a method comprising:

providing a compositioning domain executing on a processor as a guest machine above a hypervisor, the compositioning domain to facilitate interaction between a user and at least two domains in which applications execute, the at least two domains executing as separate execution environments for executing their respective applications, wherein the compositioning domain facilitates interaction between the user and the at least two domains in a secure manner preventing cross-domain transfer of data, and wherein the facilitating interaction comprises:

obtaining by the compositioning domain pixel information from the at least two domains via one or more read-only communication paths that are read-only from the compositioning domain to the at least two domains, the obtained pixel information comprising at least some pixel information from each domain of the at least two domains, wherein pixel information obtained from one domain of the at least two domains differs from pixel information obtained from another domain of the at least two domains;

providing a user interface to the user, the providing comprising providing a display buffer of the compositioning domain, the display buffer comprising the obtained pixel information including the at least some pixel information from each domain of the at least two domains for simultaneous display of the at least some pixel information from each domain of the at least two domains to the user; and maintaining an in-focus domain state indicating which domain of the at least two domains is currently in-focus, wherein user input from the user based on the user interface is provided by a user input handler directly to the currently in-focus domain indicated by the in-focus domain state, absent transferring the user input to the compositioning domain.

20. The computer program product of claim 19, wherein the compositioning domain obtains the pixel information from a respective display buffer of each domain of the at least two domains via the one or more read-only communication paths.

21. The computer program product of claim 20, wherein obtaining the pixel information comprises extracting first pixel information of one or more graphical user interface windows of the first domain from the display buffer of the first domain and extracting second pixel information of one or more graphical user interface windows of the second domain from the display buffer of the second domain, and wherein providing the user interface further comprises providing at least some of the first extracted pixel information and at least some of the second extracted pixel information to the display buffer of the compositioning domain for simultaneous output thereof to the user via at least one display device.

22. The computer program product of claim 20, wherein providing the user interface further comprises adding pixel information to the obtained pixel information from the at least two domains, wherein the added pixel information adds pixels to the display buffer of the compositioning domain to identify the window from the first domain as being from the first domain, and to identify the window from the second domain as being from the second domain.

23. The computer program product of claim 19, wherein maintaining the in-focus domain state comprises monitoring the user input from the user to detect interaction with pixels from a domain other than the in-focus domain, wherein, based on detecting interaction with pixels from the other domain, the compositioning domain switches focus to the other domain as the in-focus domain, and wherein, based on the switch in focus to the other domain as the in-focus domain, user input from the user is provided by the user input handler directly to the other domain.

24. The computer program product of claim 19, wherein the compositioning domain executes as one guest machine above the hypervisor and the at least two domains execute as at least two additional guest machines above the hypervisor separate from the one guest machine.

25. The method of claim 1, wherein guest machine memory pages of the at least two domains, the guest memory pages being accessible to the compositioning domain, are read-only for the compositioning domain, thereby preventing transfer of data from the compositioning domain to any of the at least two domains, to facilitate the interaction between the user and the at least two domains in the secure manner in which cross-domain transfer of data is prevented.

* * * * *